United States Patent [19]
Harada et al.

[11] Patent Number: 4,840,849
[45] Date of Patent: Jun. 20, 1989

[54] LAMINATED ARTICLE FROM MOLDING COMPOSITIONS OF A CHLOROSULFONATED POLYOLEFIN AND A FLUORINE-CONTAINING ELASTOMER

[75] Inventors: Yukihiko Harada; Tatsushi Nakagawa; Junichiro Kanesaka; Yousuke Kaneshige, all of Yamaguchi, Japan

[73] Assignee: Tosoh Corporation, Japan

[21] Appl. No.: 87,189

[22] Filed: Aug. 20, 1987

[30] Foreign Application Priority Data

Aug. 20, 1986 [JP] Japan ................................ 61-192787

[51] Int. Cl.$^4$ ...................... B32B 27/06; B32B 27/00; C08L 23/16
[52] U.S. Cl. .................................... 428/419; 428/421; 428/422; 428/689; 428/516; 428/287; 428/517
[58] Field of Search ............... 428/493, 419, 516, 517, 428/421, 422

[56] References Cited

U.S. PATENT DOCUMENTS 2,979,418 4/1961 Dipner .......................... 428/422 X

FOREIGN PATENT DOCUMENTS 1435524 5/1976 United Kingdom .

Primary Examiner—P. C. Ives
Attorney, Agent, or Firm—Sughrue, Mion, Zinn, Macpeak, and Seas

[57] ABSTRACT

In accordance with this invention there is obtained a laminated article in which a chlorosulfonated polyolefin composition and a fluorine-containing elastomer composition have firmly bonded to each other by making good use of a chlorosulfonated polyolefin composition containing in particular a lead compound and a peroxide as indispensable components. In order to prepare such a laminated product a layer of chlorosulfonated polyolefin composition containing a lead compound and a peroxide as indispensable components and a layer of fluorine-containing elastomer composition are laminated by molding and then brought to vulcanizing adhesion by subjecting to the conventional process of vulcanization such as steam vulcanization in autoclave, press vulcanization, etc.

The laminated article obtained in accordance with this invention is adapted for use as hoses such as fuel oil hoses of automobiles, gas hoses, etc., sheets, or other industrial goods.

4 Claims, No Drawings

LAMINATED ARTICLE FROM MOLDING COMPOSITIONS OF A CHLOROSULFONATED POLYOLEFIN AND A FLUORINE-CONTAINING ELASTOMER

FIELD OF THE INVENTION

This invention relates to a laminated article obtained by molding a chlorosulfonated polyolefin composition and a fluorine-containing elastomer composition. More particularly, this invention relates to a laminated article comprising a chlorosulfonated polyolefin composition layer having firmly bonded thereto a fluorine-containing elastomer composition layer.

Such a laminated article is useful as hoses of automobiles which are typified by, for instance, fuel oil hoses of automobiles consisting of an internal layer of a fluorine-containing elastomer and an external layer of a chlorosulfonated polyolefin.

BACKGROUND OF THE INVENTION

Fluorine-containing elastomers which are known to have peculiar properties because of the presence of fluorine atoms are characterized by their outstanding thermal resistance, oil resistance, and chemical resistance. For this reason, they are a material best adapted for use as hoses or sheets that require high thermal resistance, oil resistance, and chemical resistance, but their cost is too high as compared with those of other general rubber materials.

Thus, it is often attempted to use fluorine-containing elastomers and other materials as a composite body to save the amount of the fluorine-containing elastomers used.

For instance, in the case of fuel oil hoses of automobiles, it is considered that the internal layer coming in contact with fuel oils is made of a fluorine-containing elastomer, while the external layer is made of chlorosulfonated polyethylene which has excellent weather resistance and ozone resistance.

However, fluorine-containing elastomers show very little adhesiveness toward chlorosulfonated polyethylene so that it was very difficult to stably obtain such a laminated article having a firmly bonded adhesive surface. Thus, it has keenly been demanded to improve the adhesiveness between a fluorine-containing elastomer and a chlorosulfonated polyolefin.

SUMMARY OF THE INVENTION

An object of this invention is to provide a laminated article obtained by molding a chlorosulfonated polyolefin composition and a fluorine-containing elastomer composition wherein a chlorosulfonated polyolefin composition layer and a fluorine-containing elastomer composition layer are firmly bonded to each other.

DETAILED DESCRIPTION OF THE INVENTION

The present inventors made elaborate investigations on vulcanizing adhesion of a chlorosulfonated polyolefin composition and a fluorine-containing elastomer composition and, as the result, found that firm vulcanizing adhesion can be obtained only by a combination of a chlorosulfonated polyolefin composition which contains a lead compound and a peroxide as indispensable components with a fluorine-containing elastomer composition and achieved this invention.

That is to say, this invention is to provide a laminated article obtained by molding a chlorosulfonated polyolefin composition which contains a lead compound and a peroxide as indispensable components and a fluorine-containing elastomer composition.

The term "chlorosulfonated polyolefin" as referred to in this specification and appended claims is a material which is obtained by chlorination and chlorosulfonation of a polyolefin and which contains generally from 10 to 60 wt % of chlorine and from 0.3 to 3.0 wt % of sulfur.

A most typical is chlorosulfonated polyethylene obtained by chlorination and chlorosulfonation of polyethylene.

Besides the above, the following may also be included: chlorosulfonated ethylene-butene-1 copolymers, chlorosulfonated ethylene-propylene copolymers, chlorosulfonated ethylene-vinyl acetate copolymers, etc. that are respectively obtained by chlorination and chlorosulfonation of copolymers such as ethylene-butene-1 copolymers, ethylene-propylene copolymers, and ethylene-vinyl acetate copolymers as polyolefins.

The chlorosulfonated polyolefin composition which is used in this invention contains a lead compound and a peroxide as indispensable components, but as occasion demands, there may be added compounding ingredients such as reinforcing agents, fillers, vulcanizing agents, crosslinking assistants, promoters, retarders, plasticizers, processing assistants, stabilizers, coloring agents, etc.

Examples of the lead compound include tribasic lead maleate, dibasic lead phthalate, tribasic lead sulfate, dibasic lead phosphite, dibasic lead stearate, lead stearate, litharge, red lead, white lead, etc. Among them are preferable basic lead compounds typified by tribasic lead maleate, dibasic lead phthalate, and tribasic lead sulfate, because they are excellent in adhesiveness.

The lead compound is added in an amount of from 2 to 100 parts by weight, preferably from 20 to 70 parts by weight, based on 100 parts by weight of the chlorosulfonated polyolefin. In the case where litharge is used, however, since it is difficult to vulcanize by the use of a peroxide, the amount of litharge to be added is preferably set up to be 20 parts by weight or less.

Examples of the peroxide include dicumyl peroxide, di-t-butyl peroxide, t-butylcumyl peroxide, α,α'-bis(t-butylperoxy)-p-diisopropylbenzene, 2,5-dimethyl-2,5-di(t-butylperoxy)hexane, 2,5-dimethyl-2,5-di(t-butylperoxy)hexine-3, 2,5-dimethyl-2,5-di(benzoylperoxy)-hexane, etc.

The peroxide is used in an amount of from 0.5 to 20 parts by weight, preferably from 2 to 10 parts by weight, based on 100 parts by weight of the chlorosulfonated polyolefin.

In general, in peroxide-vulcanization, a crosslinking assistant having a double bond is very often used in addition to the above-described peroxide. In this invention, use of a crosslinking assistant such as triallylcyanurate, triallylisocyanurate, trimethylolpropane trimethacrylate, etc. is desirable, too.

What is important in practice of this invention is to effect covulcanization of a fluorine-containing elastomer when a chlorosulfonated polyolefin is vulcanized in the presence of a lead compound by peroxide-vulcanization. If either of the lead compound or the peroxide is missing in the chlorosulfonated polyolefin composition, the composition can no longer achieve firm vulcanizing adhesion with a fluorine-containing elastomer composition.

The vulcanization system of the chlorosulfonated polyolefin can generally be divided into the following three groups: (1) the group using sulfur-based vulcanization promoters typified by dipentamethylenethiuram tetrasulfide (TRA), tetramethylthiuram disulfide (TT), and ethylenethiourea (#22); (2) the group using maleimide; and (3) the group using peroxides.

Even when using a lead compound in accordance with this invention, no large bonding strength can be obtained in the vulcanization system using no peroxide such as, for example, (1) or (2).

On the other hand, even by the use of a vulcanization system containing a peroxide, no large bonding strength can also be obtained unless a lead compound is contained. Only when peroxide-vulcanization is performed by the use of a lead compound, chlorosulfonated polyolefin layer and a fluorine-containing elastomer layer can achieve firm vulcanizing adhesion.

Examples of the reinforcing agent and filler used in a chlorosulfonated polyolefin composition include carbon black, white carbon, calcium carbonate, clay, talc, titanium oxide, etc.

Examples of the vulcanizing agent and crosslinking assistant include metal oxides such as magnesia, calcium hydroxide, calcium oxide, etc. in addition to the abovedescribed peroxide and crosslinking assistant having a double bond.

A process using a sulfur-based promoter in combination in the peroxide-vulcanization may also be considered, but as combination of such a sulfur-based vulcanization promoter causes a lowering of the bonding strength, it is desired to be added in an amount of 2 parts by weight or less.

Examples of the plasticizer include phthalic acid esters, sebacic acid esters, various kinds of oils, chlorinated paraffins, etc.

Examples of the processing assistant include low-molecular weight polyethylene, polyhydric alcohols, metallic soaps, etc.

Examples of the stabilizer include nickel dibutyldithiocarbamate (NBC), amine- or phenol-based antioxidants, etc.

Examples of the coloring agent include various kinds of inorganic and organic pigments.

As fluorine-containing elastomer compositions, as occasion demands there may be added compounding ingredients, such as acid-acceptors, fillers, vulcanizing agents, plasticizers, processing assistants, etc. in addition to the fluorine-containing elastomer.

Examples of the fluorine-containing elastomer include vinylidene fluoride-hexafluoropropene-based rubbers, vinylidene fluoride-chlorotrifluoroethylene-based rubbers, vinylidene fluoride-pentafluoropropene-based rubbers, etc.

Examples of the acid-acceptor include magnesia, litharge, calcium oxide, etc.

Examples of the filler include carbon black, talc, white carbon, calcium carbonate, clay, etc.

Examples of the vulcanizing agent include polyamines, polyols, peroxides, etc.

Examples of the plasticizer and processing assistant include silicone oils, stearic acid, low-molecular weight polyethylene, etc.

There is no particular limitation to the vulcanization system and compounding system of a fluorine-containing elastomer composition, so that any of vulcanization systems and compounding systems can be used.

There is no particular limitation to the method of lamination, and any processes which can place a chlorosulfonate polyolefin composition layer and a fluorine-containing elastomer composition layer in an intimate contact state prior to the vulcanizing adhesion, will suffice. For instance, for molding hoses double extrusion method may be employed.

As the method for vulcanizing adhesion of lamination-molded layers of a chlorosulfonated polyolefin composition and a fluorine-containing elastomer composition, the conventional method of vulcanizing chlorosulfonated polyethylene such as steam vulcanization in autoclave or press vulcanization is carried out while bringing both layers in intimate contact.

It is also possible to enhance the strength of the laminated structure by interposing fibers such as nylon, aramid, etc. between the chlorosulfonated polyolefin composition layer and the fluorine-containing elastomer composition layer.

With reference to the following examples, this invention will be more fully explained, but it should be understood that these examples are given for the purpose of illustration and not limitation of the invention.

In addition, the data used in these examples were obtained according to the following methods of measurement.

Physical properties in normal state: JIS K6301 (with respect to press-vulcanized product)

Peeling test: JIS K6301

Test specimens obtained by steam vulcanization in autoclave of two test materials having a width of 1 inch in intimate contact with each other were subjected to T-peeling test at a velocity of 200 mm/min. to determine the adhesive strength.

The test materials used are as follows:

[Chlorosulfonated polyethylene]

TOSO-CSM ® manufactured by Toyo Soda Manufacturing Co., Ltd.

TS-530
TS-930
TS-220
TS-740

Hypalon ® manufactured by E. I. Du Pont de Nemours and Company.

40
LD 999

[Fluorine-containing elastomer]

Fluorel ® sold by Sumitomo 3M Limited.

FC-2120
FC-2174

Tecnoflon ® sold by Nippon Zeon Co., Ltd.

THF

Viton ® A and Viton ® B manufactured by E. I. Du Pont de Nemours and Company.

EXAMPLES 1 TO 13 AND COMPARATIVE EXAMPLES 1 TO 13

Various kinds of chlorosulfonated polyethylenes as shown in Tables 1 and 2 were mixed with Formulation A indicated in Table 3 to give basic blends, to which were added varying amounts of various ingredients in Formulation B indicated in Tables 1 and 2. By kneading and blending the resulting mixtures by means of a 10-inch open roll, chlorosulfonated polyethylene compositions were prepared.

The figures of chlorosulfonated polyethylene, Formulation A, and Formulation B in Tables 1 to 3 indicate parts by weight of the composition.

The total parts by weight of kneaded compositions that are the sum of chlorosulfonated polyethylene, Formulation A, and Formulation B are shown as total in Tables 1 and 2.

Part of the compositions are press-vulcanized under the conditions indicated as vulcanization conditions in the columns of physical properties in normal state in Tables 1 and 2, and their physical properties were measured as shown in these columns.

On the other hand, the rest of the chlorosulfonated polyethylene composition was subjected to steam vulcanization in autoclave at 165° C. for 30 minutes with various kinds of fluorine-containing elastomer compositions.

The formulations of the fluorine-containing elastomer compositions are shown in Table 4 in terms of part by weight. Further, for reference, physical properties by press vulcanization in a normal state of fluorine-containing elastomer compositions are also shown together in Table 4.

The test specimens obtained as laminated articles by molding a chlorosulfonated polyethylene composition layer and a fluorine-containing elastomer composition layer that were brought to vulcanizing adhesion by steam vulcanization in autoclave were subjected to the T-peeling test to measure the bonding stength. The results are shown as peeling strength in Tables 1 and 2.

In addition, in Examples 2 and 5, since no definite peeling strength could be obtained owing to the cohesive failure of the rubber layer, it was described merely as 10.0 or more.

As seen from the Examples, it is obvious that the laminated article obtained by molding a chlorosulfonate polyolefin composition containing a lead compound and a peroxide as indispensable components and a fluorine-containing elastomer composition shows the firm bonding of both the layers. In contrast to this, as seen from the Comparative Examples, if either the lead compound or the peroxide is missing in the chlorosulfonated polyethylene composition, no firm bonding can be obtained.

In the light of the above-described Examples and Comparative Examples, it is evident that this invention can provide a laminated article in which a chlorosulfonated polyolefin composition layer and a fluorine-containing elastomer composition layer have firmly bonded to each other.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|
| Chlorosulfonated polyethylene | | | | | | | | | | | | | |
| TS-530 | 100 | 100 | 100 | 100 | 100 | 100 | | 100 | 80 | 100 | 100 | 100 | 100 |
| TS-930 | | | | | | | 100 | | | | | | |
| TS-220 | | | | | | | | | 20 | | | | |
| Formulation B | | | | | | | | | | | | | |
| Tribasic lead maleate | 40 | 40 | 40 | 20 | 40 | | 40 | | 30 | 40 | 40 | 40 | 40 |
| Dibasic lead phthalate | | | | | | | | 40 | | | | | |
| Tribasic lead sulfate | | | | | | 40 | | | | | | | |
| MgO | | | | 10 | | | | | | | | | |
| Ca(OH)₂ | 10 | 10 | 10 | 10 | 10 | 10 | 10 | 10 | 10 | 10 | 10 | 10 | 10 |
| CaO | 10 | 10 | 10 | 10 | 10 | 10 | 10 | 10 | 10 | 10 | 10 | 10 | 10 |
| Triallylcyanurate | 3 | 3 | 3 | 3 | 3 | 3 | 3 | 3 | 3 | 3 | 3 | 3 | 3 |
| Percumyl ® D-40* | | | 6 | | | | | | | | | | |
| Peroxymon ® F-40** | 6 | | | 6 | 6 | 6 | 6 | 6 | 6 | 6 | 6 | 6 | 6 |
| Perhexa ® 25B-40*** | | 6 | | | | | | | | | | | |
| MgF₂ | | | | | 5 | | | | | | | | |
| Total | 299 | 299 | 299 | 289 | 304 | 299 | 299 | 299 | 289 | 299 | 299 | 299 | 299 |
| Physical properties in normal state | | | | | | | | | | | | | |
| Vulcanization Condition 165° C. × (minute) | 30 | 30 | 30 | 30 | 30 | 30 | 30 | 30 | 20 | 30 | 30 | 30 | 30 |
| Hardness (JIS A-Method) | 69 | 66 | 65 | 70 | 68 | 63 | 67 | 66 | 65 | 69 | 69 | 69 | 69 |
| Tensile strength (kg/cm²) | 100 | 78 | 85 | 102 | 92 | 79 | 113 | 81 | 81 | 100 | 100 | 100 | 100 |
| Elongation (%) | 270 | 330 | 380 | 260 | 320 | 450 | 320 | 380 | 280 | 270 | 270 | 270 | 270 |
| 100% Tensile stress (kg/cm²) | 46 | 31 | 28 | 49 | 36 | 23 | 40 | 30 | 35 | 46 | 46 | 46 | 46 |
| Fluorine-containing Elastomer | | | | | | | | | | | | | |
| Fluorel ® FC-2120 | O | O | O | O | O | O | O | O | O | | | | |
| Fluorel ® FC-2174 | | | | | | | | | | O | | | |
| Tecnoflon ® THF | | | | | | | | | | | O | | |
| Viton ® A | | | | | | | | | | | | O | |
| Viton ® B | | | | | | | | | | | | | O |
| Peeling strength (kg/inch) | 11.8 | ≧10.0 (cohesive failure) | 11.4 | 9.8 | ≧10.0 (cohesive failure) | 11.3 | 8.5 | 9.4 | 9.5 | 9.4 | 11.0 | 13.8 | 14.5 |

*a product of Nippon Oil and Fats Co., Ltd. for a 40% diluted product of dicumyl peroxide.
**a product of Nippon Oil and Fats Co., Ltd. for a 40% diluted product of α, α'-bis(t-butylperoxy)-p-diisopropylbenzene.
***a product of Nippon Oil and Fats Co., Ltd. for a 40% diluted product of 2,5-dimethyl-2,5-di(t-butylperoxy)hexane.

TABLE 2

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 | Comp. Ex. 12 | Comp. Ex. 13 |
|---|---|---|---|---|---|---|---|---|---|---|---|---|---|
| Chlorosulfonated polyethylene | | | | | | | | | | | | | |
| TS-530 | 100 | 100 | 100 | 100 | 100 | 100 | 100 | 100 | 100 | 80 | | 50 | 80 |
| TS-740 | | | | | | | | | | | | 50 | |
| TS-220 | | | | | | | | | | 20 | | | 20 |
| Hypalon ® 40 | | | | | | | | | | | 50 | | |
| Hypalon ® LD999 | | | | | | | | | | | 50 | | |
| Formulation B | | | | | | | | | | | | | |
| Tribasic lead maleate | | | | | 40 | 40 | 40 | | | | | | |
| PbO | | | | | | | | 30 | 6 | | | | |
| MgO | 20 | 4 | 20 | | | | | | 4 | 20 | 20 | 20 | 20 |
| Ca(OH)$_2$ | 10 | 10 | 10 | 4 | 10 | 10 | 4 | 10 | 10 | 10 | 10 | 10 | 10 |
| CaO | 10 | 10 | 10 | 10 | 10 | 10 | 10 | 10 | 10 | 10 | 10 | 10 | 10 |
| Promoter TRA | 2 | 2 | | | 2 | | | 2 | 1 | | | | |
| Pentaerythritol* | | 3 | | | | | | | 3 | | | | |
| Triallylcyanurate | | | 3 | | | | | | | 3 | 3 | 3 | 3 |
| Peroxymon F-40 | | | 6 | | | | | | | 6 | 6 | 6 | 6 |
| Promoter TT | | | | | | | 2 | | | | | | |
| Sulfur | | | | | | | 1 | | | | | | |
| Vulnoc ® PM** | | | | 3 | | | | 3 | 1 | | | | |
| Antioxidant AW*** | | | | 2 | | | | 2 | | | | | |
| Antioxidant NBC | | | | | | | | | 3 | | | | |
| MgF$_2$ | | | | | | | | | | | | | 2 |
| Promoter DM**** | | | | | 0.5 | | | | | | | | |
| Total | 272 | 259 | 279 | 249 | 292.5 | 293 | 289 | 282 | 268 | 279 | 279 | 279 | 281 |
| Physical properties in normal state | | | | | | | | | | | | | |
| Vulcanization Condition 165° C. × (minute) | 20 | 20 | 30 | 30 | 10 | 10 | 10 | 20 | 20 | 20 | 20 | 20 | 20 |
| Hardness (JIS A-method) | 79 | 78 | 72 | 67 | 76 | 77 | 72 | 74 | 66 | 72 | 72 | 74 | 72 |
| Tensile strength (kg/cm$^2$) | 134 | 133 | 98 | 102 | 142 | 136 | 98 | 127 | 112 | 93 | 92 | 94 | 90 |
| Elongation (%) | 150 | 220 | 270 | 230 | 190 | 200 | 250 | 250 | 360 | 260 | 220 | 300 | 240 |
| 100% Tensile stress (kg/cm$^2$) | 104 | 85 | 49 | 46 | 91 | 86 | 54 | 64 | 35 | 54 | 53 | 48 | 54 |
| Fluorine-containing Elastomer | | | | | | | | | | | | | |
| Fluorel ® FC-2120 | O | O | O | O | O | O | O | O | O | O | O | O | O |
| Peeling strength (kg/inch) | 0.1 | 0.2 | 1.3 | 0.1 | 0.3 | 0.1 | 0.1 | 0.1 | 0.1 | 2.0 | 2.8 | 2.2 | 2.8 |

*to be used as a vulcanization assistant.
**N,N'—m-phenylenedimaleimide
***6-ethoxy-1,2-dihydro-2,2,4-trimethylquinoline
****2-benzothiazoyl disulfide

TABLE 3

| Formulation A | |
|---|---|
| SRF carbon (a variation of carbon black) | 40 parts by weight |
| Light-weight calcium carbonate | 60 parts by weight |
| Dioctyl sebacate | 15 parts by weight |
| Naphthene-based oil | 10 parts by weight |
| ACpolyethylene ® 617A (a product of Allied Chemical Corp.) | 3 parts by weight |
| ACpolyethylene ® 1702 (a product of Allied Chemical Corp.) | 2 parts by weight |

TABLE 4

|  | Fluorel ® FC-2120 | Fluorel ® FC-2174 | Tecnoflon ® THF | Viton ® A | Viton ® B |
|---|---|---|---|---|---|
| Formulation C | | | | | |
| Fluorine-containing elastomer | 100 | 100 | 100 | 100 | 100 |
| MT carbon black* | 25 | 25 | 25 | 25 | 25 |
| Barium sulfate | 25 | 25 | 25 | 25 | 25 |
| Kyowa MAG ® #150** | 3 | 3 | 3 | 3 | 3 |
| Ca(OH)$_2$ | 3 | 3 | 3 | 3 | 3 |
| Promoter Diak ® #3*** | — | — | — | 3 | 3 |
| Total | 156 | 156 | 156 | 159 | 159 |
| Physical properties in normal state | | | | | |
| Vulcanization conditions 165° C. × (minute) | 20 | | | | |
| Hardness (JIS A-method) | 78 | | | | |

TABLE 4-continued

| | Fluorel ® FC-2120 | Fluorel ® FC-2174 | Tecnoflon ® THF | Viton ® A | Viton ® B |
|---|---|---|---|---|---|
| Tensile strength (kg/cm$^2$) | 86 | | | | |
| Elongation (%) | 340 | | | | |
| 100% Tensile Stress (kg/cm$^2$) | 37 | | | | |

*a variation of carbon black
**MgO, a product of Kyowa Kagaku Kogyo K. K.
***a product of E.I. Du Pont de Nemours and Company for N,N'-dicinnamyliden-1,6-hexanediamine.

While the invention has been described in detail and with reference to specific embodiments thereof, it will be apparent to one skilled in the art that various changes and modifications can be made therein without departing from the spirit and scope thereof.

What is claimed is:

1. A laminated article obtained by molding a chlorosulfonated polyolefin composition and a fluorine-containing elastomer composition, wherein said chlorosulfonated polyolefin composition contains (a) a lead compound present in an amount of from 2 to 100 parts by weight based on 100 parts by weight of the chlorosulfonated polyolefin composition, and (b) a peroxide present in an amount of from 0.5 to 20 parts by weight based on 100 parts by weight of the chlorosulfonated polyolefin composition, and wherein said chlorosulfonated polyolefin contains from 10 to 60 wt % of chlorine and from 0.3 to 3.0 wt % of sulfur.

2. A laminated article as in claim 1, wherein said chlorosulfonated polyolefin is chlorosulfonated polyethylene.

3. A laminated article as in claim 1, wherein said lead compound is selected from the group consisting of tribasic lead maleate, dibasic lead phthalate, and tribasic lead sulfate.

4. A laminated article as in claim 1, wherein said laminated article is a fuel oil hose for automobiles.

* * * * *